United States Patent
Lee et al.

(10) Patent No.: US 12,526,535 B2
(45) Date of Patent: Jan. 13, 2026

(54) ELECTRONIC DEVICE AND METHOD OF GENERATING HIGH-DEFINITION IMAGE

(71) Applicant: SAMSUNG ELECTRONICS CO., LTD., Suwon-si (KR)

(72) Inventors: Jeisung Lee, Suwon-si (KR); Jeongguk Lee, Suwon-si (KR); Seongwook Song, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 274 days.

(21) Appl. No.: 18/069,973

(22) Filed: Dec. 21, 2022

(65) Prior Publication Data

US 2023/0209215 A1    Jun. 29, 2023

(30) Foreign Application Priority Data

Dec. 22, 2021 (KR) .................. 10-2021-0185409
Aug. 2, 2022 (KR) .................. 10-20220096267

(51) Int. Cl.
*H04N 23/80* (2023.01)
*H04N 23/10* (2023.01)
*H04N 23/84* (2023.01)
*H04N 23/88* (2023.01)
*H04N 25/44* (2023.01)

(52) U.S. Cl.
CPC .......... *H04N 23/815* (2023.01); *H04N 23/10* (2023.01); *H04N 23/843* (2023.01); *H04N 23/88* (2023.01); *H04N 25/44* (2023.01)

(58) Field of Classification Search
CPC .... H04N 23/815; H04N 23/10; H04N 23/843; H04N 23/88; H04N 25/44; H04N 23/617; H04N 23/90; H04N 25/13; H04N 25/134; G06T 3/4046; G06T 3/4015; G06T 3/4007; G06N 20/00
See application file for complete search history.

(56) References Cited

U.S. PATENT DOCUMENTS

| | | | |
|---|---|---|---|
| 8,411,153 B2 | 4/2013 | Cho | |
| 8,804,009 B2 | 8/2014 | Cho | |
| 8,994,845 B2 | 3/2015 | Mankowski | |
| 9,229,526 B1 | 1/2016 | Neglur et al. | |
| 9,516,234 B2 | 12/2016 | Baek et al. | |
| 10,326,942 B2 | 6/2019 | Shabtay et al. | |
| 10,445,861 B2 | 10/2019 | Song | |
| 10,764,507 B1* | 9/2020 | Li | H04N 23/741 |
| 10,943,335 B2 | 3/2021 | Nishimura et al. | |
| 11,044,407 B2 | 6/2021 | Jeong et al. | |

(Continued)

FOREIGN PATENT DOCUMENTS

KR    10-2021-0047070    4/2021

*Primary Examiner* — Abdelaaziz Tissire
(74) *Attorney, Agent, or Firm* — Morgan, Lewis & Bockius LLP

(57) ABSTRACT

An electronic device includes an image sensor that generates first image data upon receiving external light, generates second image data based on the first image data, and outputs the first image data and the second image data, and an application processor that increases resolution of at least a region of an image that corresponds to the first image data using a machine learning algorithm and outputs third image data that includes at least a portion of the first image data with increased resolution and at least a portion of the second image data.

15 Claims, 10 Drawing Sheets

(56) References Cited

U.S. PATENT DOCUMENTS

| | | | | |
|---|---|---|---|---|
| 11,184,553 | B1* | 11/2021 | Liu | H04N 23/84 |
| 11,523,055 | B1* | 12/2022 | Chaudhri | G06T 3/4053 |
| 2005/0063611 | A1* | 3/2005 | Toki | G01N 23/046 |
| | | | | 382/299 |
| 2013/0044962 | A1* | 2/2013 | Kim | G06F 16/58 |
| | | | | 455/566 |
| 2014/0253808 | A1* | 9/2014 | Tachi | H04N 23/843 |
| | | | | 348/624 |
| 2019/0026864 | A1* | 1/2019 | Chen | G06T 3/4053 |
| 2020/0077026 | A1* | 3/2020 | Jeong | H04N 1/2112 |
| 2020/0204746 | A1* | 6/2020 | Kang | H04N 25/134 |
| 2020/0294191 | A1* | 9/2020 | Chuang | G06T 11/001 |
| 2020/0314362 | A1* | 10/2020 | Roh | H04N 25/583 |
| 2021/0008755 | A1 | 1/2021 | Kim et al. | |
| 2021/0067749 | A1* | 3/2021 | Yadav | H04N 25/135 |
| 2021/0211615 | A1* | 7/2021 | Kim | H04N 25/60 |
| 2021/0217134 | A1* | 7/2021 | Okamura | G06T 3/4015 |
| 2022/0224820 | A1* | 7/2022 | Liu | H04N 25/134 |
| 2022/0224852 | A1* | 7/2022 | Kim | H04N 23/80 |
| 2022/0253978 | A1* | 8/2022 | Park | H04N 23/815 |
| 2022/0417428 | A1* | 12/2022 | Jeon | H04N 23/69 |

\* cited by examiner

ELECTRONIC DEVICE AND METHOD OF GENERATING HIGH-DEFINITION IMAGE

CROSS-REFERENCE TO RELATED APPLICATIONS

This application claims priority under 35 U.S.C. § 119 from Korean Patent Application Nos. 10-2021-0185409, filed on Dec. 22, 2021 in the Korean Intellectual Property Office, and 10-2022-0096267, filed on Aug. 2, 2022 in the Korean Intellectual Property Office, the contents of both of which are herein incorporated by reference in their entireties.

TECHNICAL FIELD

Embodiments of the inventive concept are directed to an electronic device, and more particularly, to a method of generating a high-definition image using an electronic device.

DISCUSSION OF THE RELATED ART

Image sensors can capture a two-dimensional (2D) or three-dimensional (3D) image of an object. An image sensor generates an image of an object using a photoelectric conversion element that responds to the intensity of light reflected from the object. Recently, with the development of complementary metal-oxide semiconductor (CMOS) technology, CMOS image sensors that use CMOS have become widely used. An image sensor includes a pixel array, and as the image sensor is implemented with a high number of pixels, the pixel array includes a large number of color pixels. To convert a raw image output from the image sensor into a pattern, such as an RGB image, remosaic processing based on interpolation and/or extrapolation is performed.

The image sensor uses a merged pixel and an image signal processor (ISP) operation function to generate a high-definition image. An electronic device generates a high-definition image using merged pixels, such as tetra cells and Q cells. ISP operation functions that the image sensor performs include functions, such as interpolation, auto white balance adjustment, color correction, and gamma correction.

For the image sensor to generate a complex image, such as an image with many edges, as a high-definition image, the image sensor needs to process a lot of information. As one of the methods for processing a lot of information as described above, the electronic device generates a complex image as a high-definition image using machine learning. The electronic device generates a high-definition image using, for example, an artificial neural network. Artificial neural networks, a subset of machine learning, are the core of machine learning algorithms, and include one input layer, one or more hidden layers, and one output layer. Machine learning techniques that can generate a high-definition image are performed by an image sensor or an application processor (AP).

However, machine learning in an image sensor takes a long time to generate a high-definition image. In addition, a lack of resources of the image sensor can limit the generation of a high-definition image.

SUMMARY

Embodiments of inventive concept provide a method and an electronic device that generate a high-definition image by performing machine learning in an application processor to reduce the time required to generate an image.

Embodiments of the inventive concept also provide an electronic device that performs machine learning in an application processor to secure resources of an image sensor, and a method of generating a high-definition image.

According to an embodiment of the inventive concept, there is provided an electronic device that generates a high-definition image. The electronic device includes an image sensor that generates first image data upon receiving external light, generates second image data based on the first image data, and outputs the first image data and the second image data, and an application processor that increases resolution of at least a region of an image that corresponds to the first image data by using a machine learning algorithm and outputs third image data that includes at least a portion of the first image data with increased resolution and at least a portion of the second image data.

According to another embodiment of the inventive concept, there is provided a method of generating a high-definition image of an electronic device that includes an image sensor and an application processor The method includes generating first image data upon receiving external light, generating second image data based on the first image data, outputting the first image data and the second image data, and increasing resolution of at least a region of an image that corresponds to the first image data by using a machine learning algorithm and outputting third image data that includes at least a portion of the first image data with increased resolution and at least a portion of the second image data.

According to another embodiments of the inventive concept, there is provided a non-transitory computer-readable recording medium that stores an instruction that implements a method of generating a high-definition image. The method includes generating first image data upon receiving external light, generating second image data based on the first image data, outputting the first image data and the second image data, and increasing resolution of at least a region of an image that corresponds to the first image data by using a machine learning algorithm and outputting third image data that includes at least a portion of the first image data with increased resolution and at least a portion of the second image data.

DETAILED DESCRIPTION

Hereinafter, embodiments are described in detail with reference to the accompanying drawings.

Figure 1:
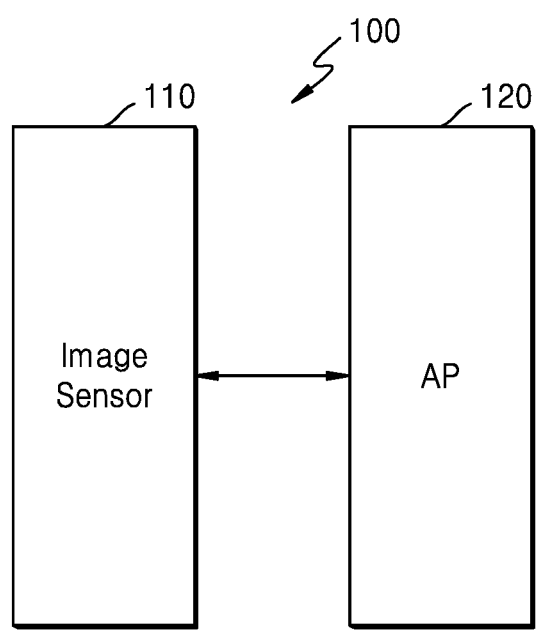
FIG. 1 illustrates a system that generates a high-definition image, according to an embodiment.

FIG. 1 illustrates a system that generates a high-definition image, according to an embodiment.

Referring to FIG. 1, in an embodiment, an electronic device 100 includes an image sensor 110 and an application processor (AP) 120, The image sensor 110 includes a pixel array that includes a plurality of two-dimensionally arranged pixels and a readout circuit, and the pixel array converts received optical signals into electrical signals. The pixel array may be implemented as, for example, a photoelectric conversion device, such as a charge coupled device (CCD) or a complementary metal oxide semiconductor (CMOS), and may be implemented with various types of photoelectric conversion devices. Hereinafter, the pixel array in the image sensor 110 is described as CMOS, but the pixel array that implements embodiments of the inventive concept is not necessarily limited thereto, in some embodiments, the image sensor 110 is implemented as a semiconductor chip or package that includes a pixel array and a readout circuit.

According to an embodiment, the image sensor 110 includes a pixel array, and a color filter array (CFA) is disposed in the pixel array to sense a color of each pixel. Hereinafter, in describing embodiments, terms of a color filter, a color pixel, a filter array, and a pixel array may be defined in various ways. For example, the CFA may be a separate component located on a pixel array that includes a light detection device or may be a component included in the pixel array. Each color pixel may include a color filter that corresponds to the color pixel. In addition, in describing the following embodiments each of the CFA cell and the CFA block includes the color pixel described above.

The CFA includes a plurality of CFA blocks that are repeatedly arranged in horizontal and vertical directions, and each CFA block includes color pixels. According to an embodiment, the CFA blocks are arranged in a pattern. According to an embodiment, the CFA blocks are arranged in a Bayer pattern. For example, the CFA blocks may be arranged in a 2×2 pattern so that the upper left corresponds to blue, the lower left and upper right correspond to green, and the lower right corresponds to red. Other patterns of the CFA blocks include a tetra pattern in which one color unit is arranged in 2×2, a nona pattern in which one color unit is arranged in 3×3, a hexadeca pattern in which one color unit is arranged in 4×4, etc. Hereinafter, in an embodiment, the CFA blocks in the CFA correspond to a Bayer pattern for convenience of description, but embodiments of the inventive concept are not necessarily limited thereto.

According to an embodiment, the image sensor 110 is part of sensor hardware (HW). The sensor HW performs an image processing operation that includes a remosaic processing operation or a demosaic processing operation on image data received from the image sensor 110.

The AP 120 performs pre-processing, such as a crosstalk correction and a despeckle operation, on the image data, and further performs post-processing, such as a sharpening operation, on the full image data. In addition, for example, the AP 120 performs image signal processing that reduces noise and improves image quality, such as automatic dark level compensation (ADLC), bad pixel correction, lens shading correction, gamma correction, CFA interpolation, color correction, and color enhancement. In addition, the AP 120 compresses image data to generate an image file, or restores image data from the image file. The AP 120 perform machine learning, such as deep learning, that improves image quality. An operation of the AP 120 that improves image quality by using machine learning is described below with reference to FIGS. 3A and 3B. A the AP 120 and the modules described below may be implemented as a software block executed by a processor or as a combination of a dedicated hardware block and a processing unit.

The AP 120 converts a format of the image data by performing an image processing operation. The AP 120 converts image data that corresponds to a color filter pattern, such as a Bayer pattern, a tetra pattern, or a hexadeca pattern, and generates full color image data in an RGB format.

Input image data that includes color information is input to the AP 120. The input image data is image data received from the image sensor 110, or is data obtained by correcting, image data received by the AP 120.

For real-time operation of a camera with zero shutter lag, the AP 120 automatically stores an output image to a preview, even without a separate command. Shutter lag refers to a time delay from when a shutter is triggered by a user pressing the camera's capture button to when a picture is actually recorded. To minimize such a time delay, the AP 120 automatically stores the output image to the camera preview without a separate command. When the shutter is triggered, the AP 120 checks a frame at the time when the shutter is actually triggered, and records a first time picture and image so that a time delay does not occur.

For example, if a user executes a camera function and the first time preview image is output to a display screen, the AP 120 stores the first time preview image. When the user presses the camera shutter at a second time, image capturing actually starts from a third time due to the shutter lag, but because the image was recorded from the first time, image capturing is performed as if the image was recorded from a frame corresponding to the second time.

Figure 2:
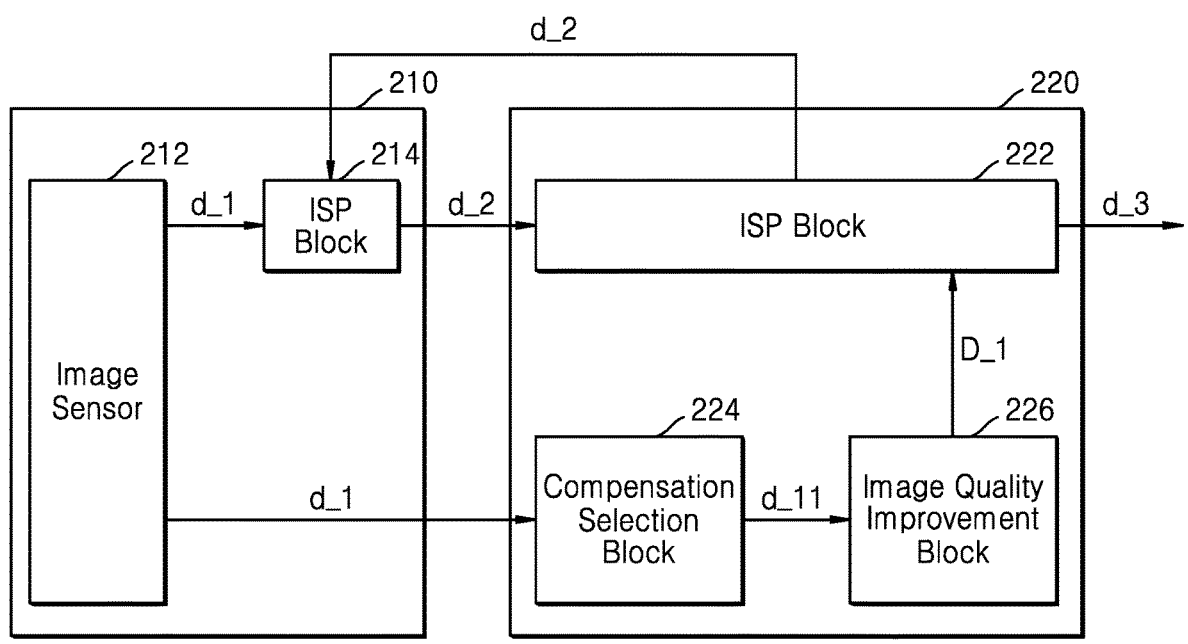
FIG. 2 illustrates generating a high-definition image between sensor hardware (HW) and an application processor, according to an embodiment.

FIG. 2 illustrates generating a high-definition image between sensor HW 210 and an AP 220, according to an embodiment.

Referring to FIG. 2, in an embodiment, the sensor HW 210 includes an image sensor 212 and a first image signal processor (ISP) block 214. The image sensor 212 performs the image sensor 110 operations described above with reference to FIG. 1. For example, the image sensor 212 generates image data by receiving external light. Hereinafter, image data is described as video data for convenience, but embodiments of the inventive concept are not necessarily limited thereto, and other embodiments use various other types of data, such as still image data.

The sensor HW 210 generates first image data d_1 and second image data d_2. For example, the first image data d_1 is raw data generated by receiving external light, and the second image data d_2 is Bayer data used to generate a raw data image. According to an embodiment, the sensor HW 210 generates the first image data d_1 by using external light, and converts a format of the first image data d_1 to generate the second image data d_2. The first image data d_1 and the second image data d_2 are used by the sensor HW 210 to generate an image. The raw data may include, but is not limited to, data that includes cells, such as a tetra cell that includes 2×2 color units, a nona cell that includes 3×3 color units, a hexadeca cell that includes 4×4 color units, and a Q cell. Bayer data refers to a pattern of color pixels that appear as a Bayer pattern, and is data calculated from raw data to generate an image.

The image sensor 212 transmits the first image data d_1 to the first ISP block 214 in the sensor HW 210. The first ISP block 214 performs pre-processing, and performs an ISP operation that generates the second image data d_2. For example, when the image sensor 212 transmits the first image data d_1 to the first ISP block 214, the first ISP block 214 receives the first image data d_1 and performs an ISP operation, such as a remosaic operation, on the first image data d_1 to generate the second image data d_2. The first ISP block 214 transmits the generated second image data d_2 to a second ISP block 222 of the AP 220.

The second image data d_2 is used to perform auto focus (AF), auto exposure (AE), and auto white balance (AWB) functions. The second image data d_2 is transmitted from the second ISP block 222 to the first ISP block 214 to perform the AE, AF, and AWB functions. The first ISP block 214 changes the received first image data d_1 into second image data d_2 so that AE, AF, and AWB functions can be performed.

The AP 220 includes a second ISP block 222, a target region selection block or compensation selection block 224, and an image quality improvement block 226. The target region selection block 224 receives the first image data d_1 from the image sensor 212 and detects a target region to increase the resolution in a first image that corresponds to the first image data d_1. The target region selection block 224 detects the target region according to various criteria. According to an embodiment, when an edge in at least one region of the first image of the first image data d_1 satisfies a certain condition, the target region selection block 224 selects that region as the target region. The edge may be a boundary line between regions in the image in which brightness rapidly changes. For example, the target region selection block 224 determines a brightness value for each region of the image of the first image data d_1. In the brightness values for each region, if a difference between the brightness values of two adjacent regions is greater than or equal to a predetermined value, a boundary between the two adjacent regions is determined to be an edge. When the number of edges per unit area of a region in the first image of the first image data d_1 is greater than a predetermined criterion, the target region selection block 224 determines the corresponding region as the target region. According to an embodiment, the target region selection block 224 generates an ambiguity map based on the first image data d_1, and determines the target region in the first image of the first image data d_1 by using the ambiguity map. According to an embodiment, when there are a plurality of regions that satisfy the predetermined criterion in the image of the first image data d_1, the target region selection block 224 determines the plurality of regions to be the target region. In addition, the target region may be the same region in the first image of the first image data d_1 and a second image that corresponds to the second image data d_2. The target region selection block 224 generates target region information for at least one target region generated by the method described above. The target region selection block 224 transmits the first image data d_1 and image quality improvement information d_11 that includes the target region information to the image quality improvement block 226.

According to an embodiment, the image sensor 210 generates the first image data d_1 based on the target region information. The image sensor 210 transmits the second image data d_2 to the AP 220. The AP 220 generates target region information based on the received second image data d_2. The AP 220 transmits the target region information back to the image sensor 210. The image sensor 210 generates a modified first image data d_1' that includes only a partial region, such as a cropped region, rather than the entire region of a camera preview, based on the target region information. For example, the image sensor 210 generates the modified first image data d_1' so that the first image of the modified first image data d_1' includes only the target region. The image sensor 210 transmits the modified first image data d_1' to the AP 220. When the modified first image data d_1' corresponds to the target region, a size thereof is much smaller than data that includes the entire region of the preview image, thus enabling a faster operation. However, even in an embodiment in which the size of the modified first image data d_1' is small, the second image data d_2 includes the entire region of the preview. The AP 220 generates third image data d_3 that has increased image quality by using the modified first image data d_1' and the second image data d_2 that include data on the target region.

The image quality improvement block 226 increases the image quality of the selected target region. The image quality improvement block 226 receives the modified first image data d_1' and image quality improvement information d_11 that include target region information from the target region selection block 224. The image quality improvement block 226 determines a target region in the first image of first image data d_1 based on target region information, and generates a first corrected image data D_1 that corresponds to a first correction image that has increased image quality in the target region. The first corrected image D_1 is generated from the first image by changing the resolution only of the target region. According to an embodiment, the image quality improvement block 226 increases the image quality of the target region by using machine learning or deep learning. The image quality improvement block 26 increases the image quality of a first image target region by using a machine learning algorithm and filtering technology, such as a convolutional neural network (CNN), a de-blocking filter (DF), a sample adaptive offset (SAO), and a variational autoencoder (VAE), although a machine learning algorithm that can be used for the image quality improvement block 226 to generate a high-definition image is not necessarily limited to the examples mentioned above. The image quality improvement block 226 transmits the first corrected image data D_1 of the first corrected image to the second ISP block 222.

The second ISP block 222 receives the first corrected image data D_1 from the image quality improvement block 226 and receives the second image data d_2 from the first ISP block 214. The second ISP block 222 performs an ISP operation, and performs a different function from that of the first ISP block 214. The second ISP block 222 performs an ISP operation that converts a format of the second image data d_2 received from the first ISP block 214. For example, the second ISP block 222 converts the second image data d_2 into second corrected image data in an RGB format using various interpolation methods, such as bilinear interpolation or pixel doubling interpolation. The second image data d_2 includes one color filter, one of red, blue, or green, per pixel, but the RGB format second corrected image data includes three colors of red, blue, and green per pixel.

The second ISP block 222 generates a high-definition image using the second corrected image data and the first corrected image data D_1. For example, the second ISP block 222 generates a third image in which only the target region in the second corrected image of the second corrected image data is replaced with corresponding data from the first corrected image. In the third image data d_3 that corresponds to the third image, only a portion that corresponds to the target region in the second corrected image data is replaced (or inserted) with the first corrected image data D_1.

The second ISP block 222 determines whether real-time processing is required by the image sensor 212, and retransmits the second image data d_2 to the first ISP block 214 when real-time processing is required. For example, when AE, AF, and AWB are to be executed, the second ISP block 222 determines that real-time processing is required and transmits the second image data d_2 to the first ISP block 214.

Figure 3A:
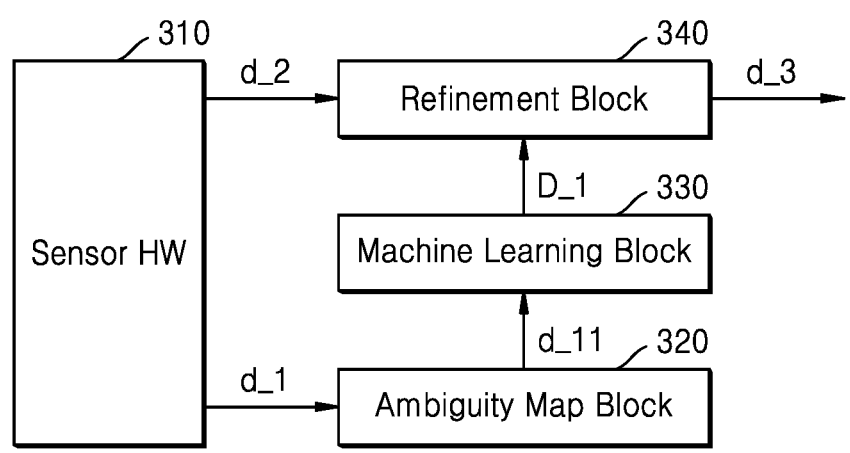
FIGS. 3A and 3B illustrate a method of generating a high-definition image by sensor hardware, according to an embodiment.
Figure 3B:
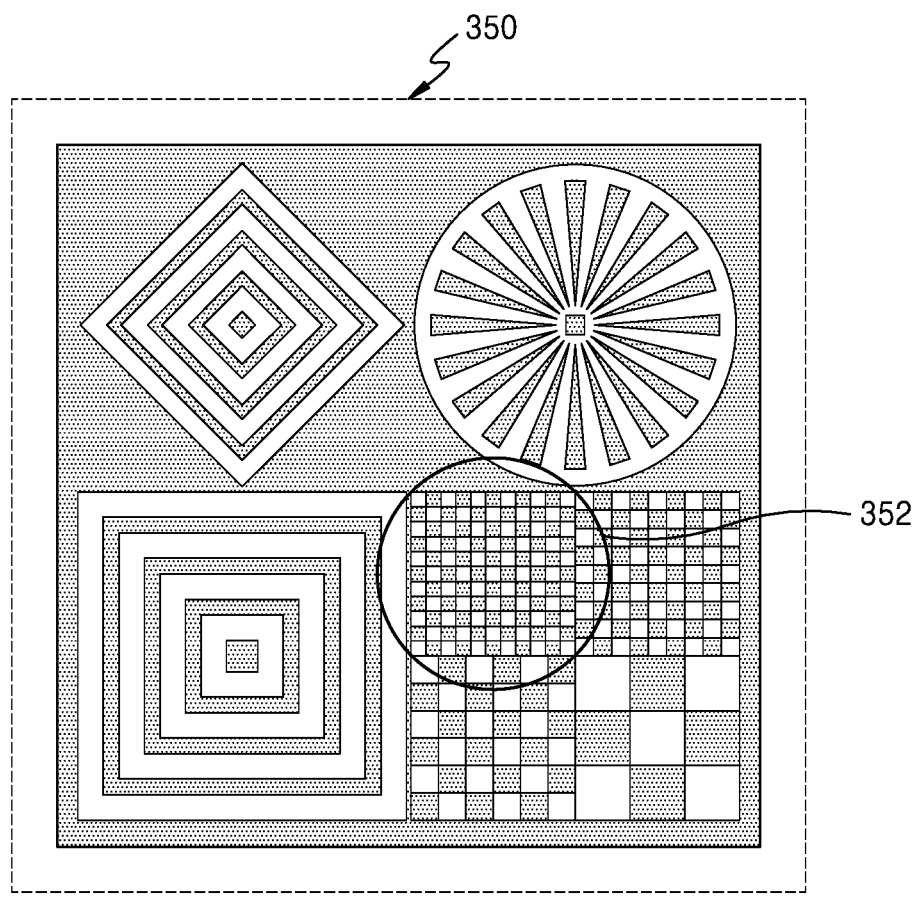

FIGS. 3A and 3B illustrate a method of generating a high-definition image by a sensor HW 310, according to an embodiment.

Referring to FIG. 3A, in an embodiment, the sensor HW 310 generates first image data d_1 and second image data d_2. FIG. 3A illustrates a process in which the sensor HW 310 generates first image data d_1 and second image data d_2 and transmits the generated first image data d_1 and second image data d_2 to an AP to generate an image with increased image quality. The first image data d_1 is raw data generated by the sensor HW 310 based on externally received light, and the second image data d_2 is Bayer data obtained by transforming the first image data d_1 by the sensor HW 310. The sensor HW 310 transmits the first image data d_1 and the second image data d_2 to the AP. Blocks 320, 330, and 340 of FIG. 3A are all included in the AP. The AP includes an ambiguity map block 320, a machine learning block 330, and a refinement block 340.

The ambiguity map block 320 generates an ambiguity map based on the first image data d_1. The ambiguity map is generated by the AP to detect a target region in the image data that requires image quality improvement. The first image data d_1 that the AP uses to generate the ambiguity map includes at least one of tetra cell, nona cell, hexadeca cell, or Q cell data. The ambiguity map block 320 generates an ambiguity map based on the first image data d_1 and determines at least one target region for improving image quality by using the ambiguity map. The ambiguity map block 320 generates target region information for at least one target region. The ambiguity map block 320 transmits the image quality improvement information d_11 that includes the target region information and the first image data d_1 to the machine learning block 330.

The machine learning block 330 receives the first image data d_1 and image quality improvement information d_11 that includes target region information from the ambiguity map block 320. The machine learning block 330 performs an image quality improvement operation on the first image of the first image data d_1. The machine learning block 330 increases the image quality of at least one target region of the first image by using machine learning. For example, the machine learning block 330 uses a machine learning algorithm, such as a CNN, a DF, an SAO, or a VAE to increase image quality. The machine learning block 330 generates the first corrected image data D_1 by applying the machine learning algorithm to the first image data d_1. In the first corrected image that corresponds to the first corrected image data D_1, the resolution of the target region in the first image is increased. The machine learning block 330 transmits the first corrected image data D_1 to the refinement block 340.

The refinement block 340 receives the first corrected image data D_1 from the machine learning block 330 and the second image data d_2 from the sensor HW 310. The refinement block 340 generates second corrected image data by transforming the format of the second image data d_2 from Bayer data to RGB. Unlike Bayer data, RGB files include all three colors of red, green, and blue in one pixel. The refinement block 340 generates the third image data d_3 based on the second corrected image data and the first corrected image data. D_1. According to an embodiment, the refinement block 340 generates the third image data d_3 by replacing at least a portion of the second corrected image data with a portion of the first corrected image data D_1. For example, the refinement block 340 generates the third image data d_3 by replacing data corresponding to the target region in the second corrected image data with data from the first corrected image data D_1 that corresponds to the target region. Because the first corrected image data D_1 corresponds to an image with increased image quality in the target region, the image quality of the target region is increased in the third image of the third image data d_3.

FIG. 3B presents a still image 350 with a target region 352 to be improved in image quality. The ambiguity map block 320 determines the target region 352. For example, the ambiguity map block 320 determines, as the target region 352, a region that has the largest number of edges in the image in which brightness rapidly changes. Thereafter, the machine learning block 330 and the refinement block 340 increase the resolution of the target region 352 using machine learning, and combine the target region 352 with Bayer data to generate a high-definition image.

Figure 4:
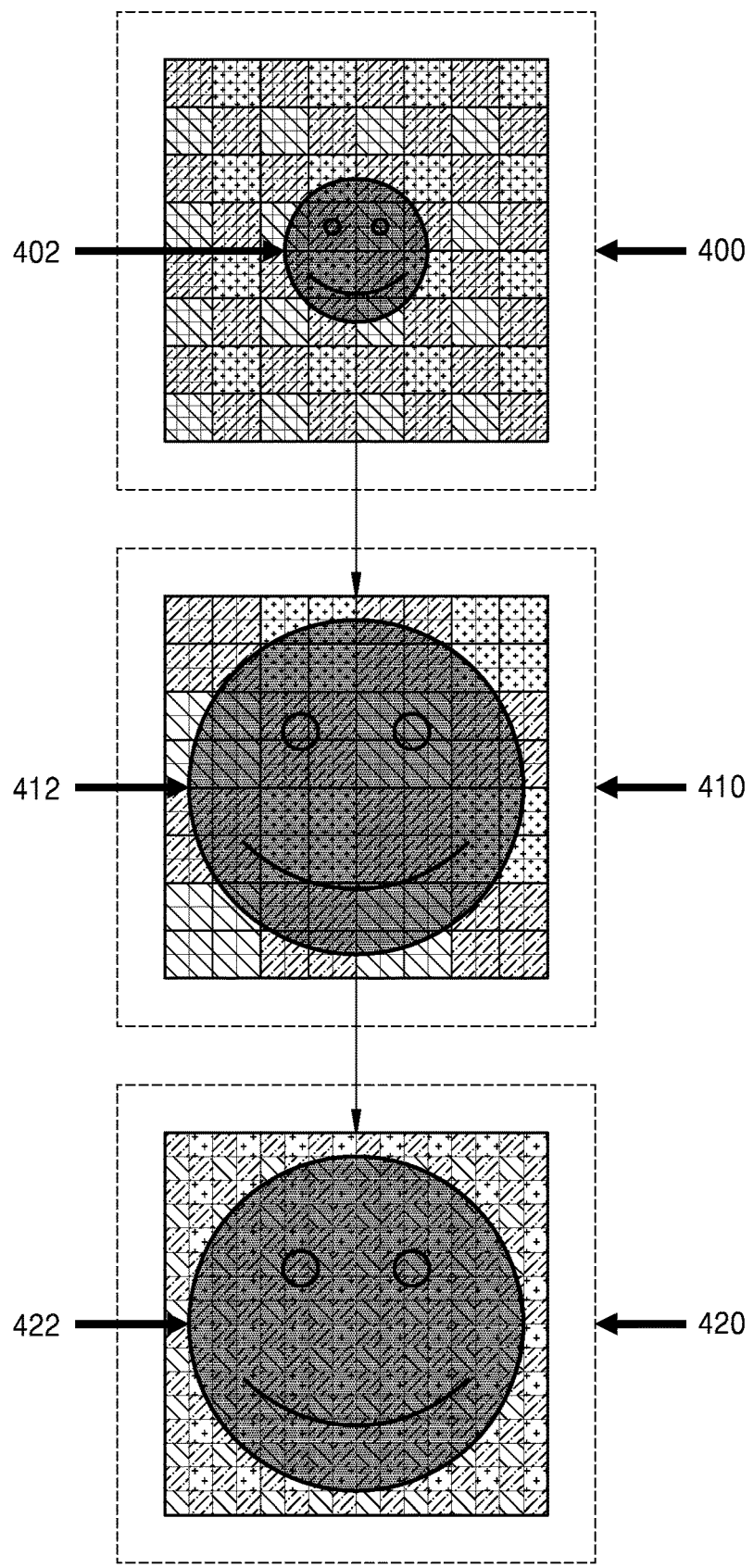
FIG. 4 illustrates an embodiment of generating a high-definition image shown in FIG. 3A.

FIG. 4 illustrates an embodiment of generating a high-definition image shown in FIG. 3A.

Referring to FIG. 4, in an embodiment, the sensor HW 310 generates a high-definition zoom image. For example, if a user who uses an electronic device executes a zoom function, when an image captured by a camera is output on a display, the sensor HW generates a high-quality zoom image using an algorithm of an embodiment of the inventive concept. Hereinafter, descriptions already given above with reference to FIGS. 1 to 3B are omitted, and an embodiment of generating, a high-quality zoom image is described.

The sensor HW 310 captures a real-time image using a merged cell, such as a tetra cell, a nona cell, a hexadeca cell, or a Q cell). Referring to FIG. 4, the sensor HW 310 captures a real-time image using hexadeca cells in which color pixels are arranged in a 4×4 bundle. For example, the sensor HW 310 captures in real time an image of a first object 402 located in the first frame 400.

The sensor HW 310 performs a zoom function that magnifies a region within the first frame 400 based on a user input. A region of interest (ROI) zoomed in the first frame 400 is located inside the second frame 410, and the first object 412 is enlarged and displayed inside the second frame 410. The sensor HW 310 configures a third frame 420 and the first object 422 by rearranging color pixels in the second frame 410 by performing an operation, such as remosaicing. The sensor HW 310 uses the merged cells in the first frame 400 and the second frame 410, but performs remosaicing in the third frame 420 to increase the resolution thereof.

The AP performs machine learning to increase the resolution of the zoomed object 412 based on a user input. The AP generates an ambiguity map based on data that corresponds to the image in the second frame 410, and performs deep learning based on data that corresponds to an image in the remosaiced third frame. Data that corresponds to an image in the second frame 410 of FIG. 4 and data that corresponds to an image in the third frame 420 of FIG. 4 correspond to the first corrected image data and the second corrected image data in an embodiment of FIG. 3, respectively.

Figure 5:
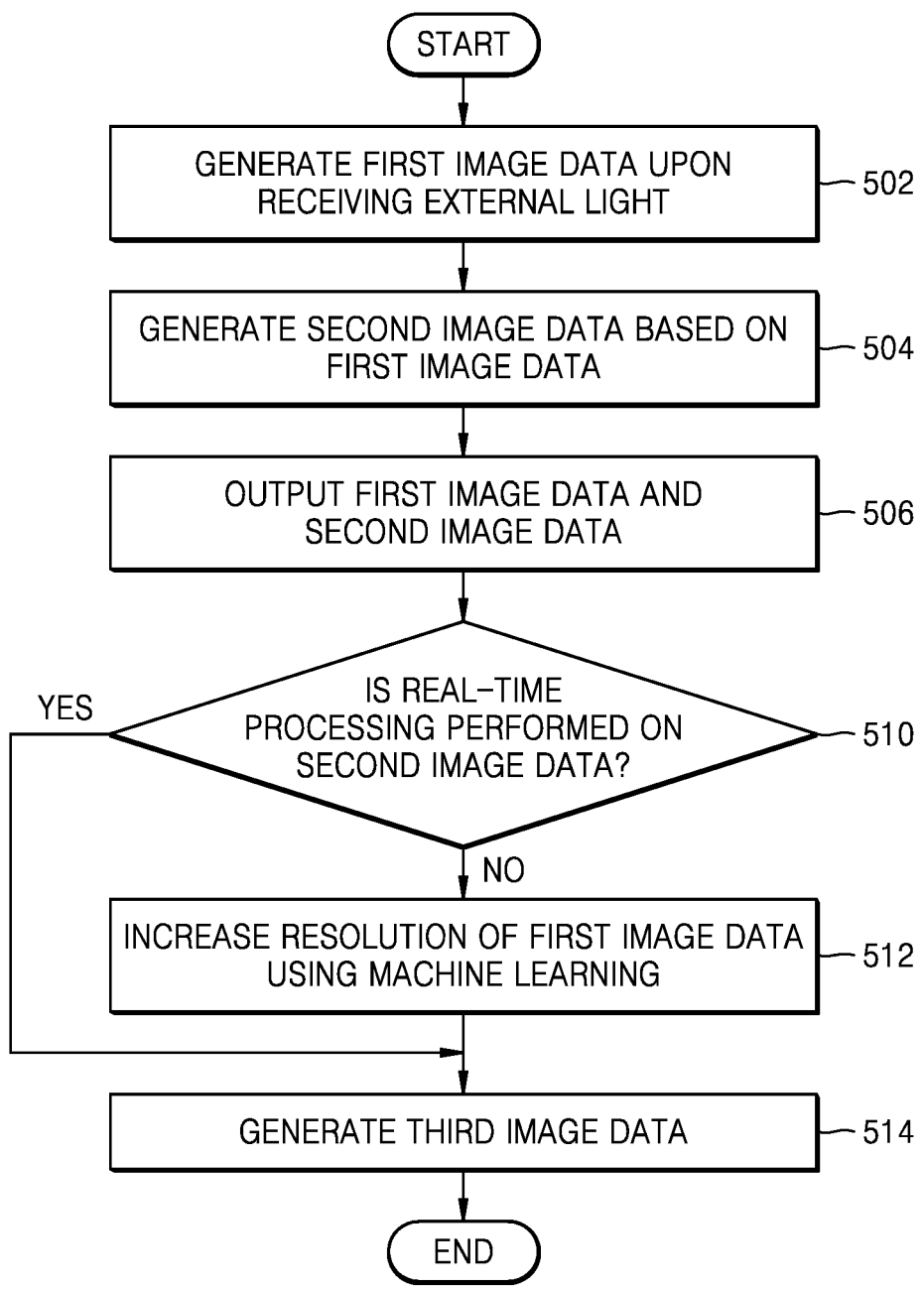
FIG. 5 is a flowchart of a method of generating a high-definition image by an electronic device, according to an embodiment.

FIG. 5 is a flowchart of a method of generating a high-definition image by an electronic device, according to an embodiment.

Referring to FIG. 5, in an embodiment, in operation 502, an image sensor generates first image data upon receiving external light. A pixel array in the image sensor generates first image data by converting the received light into an electrical signal. For example, the image sensor captures a first image and generates first image data that corresponds to the first image. The first image data is raw data. The raw data includes cells, such as tetra cells that have a 2×2 color unit, nova cells that have a 3×3 color unit, hexadeca cells that have a 4×4 color unit, or Q cells.

In operation 504, the sensor HW generates second image data based on the first image data. The second image data is Bayer data obtained by converting raw data into an image. The Bayer data has a pattern in which the color pixel array of the image sensor is arranged in a 2×2 form. The sensor HW performs an ISP operation that generates the second image data based on the first image data.

In operation 506, the image sensor outputs the first image data and the second image data and transmits the first image data and the second image data to the AP. For example, the second image data is directly transmitted to the block in the AP that performs the ISP operation, but the first image data is transmitted to the block that performs an image quality improvement operation.

In operation 510, the AP determines whether it is necessary to perform real-time processing of the second image data. For example, the AP determines whether to perform AF, AE, and AWB functions in the current image sensor. When functions, such as AF, AE, or AWB, need to be performed, the AP retransmits the second image data to the image sensor, without improving the quality of the second image data. When functions, such as AF, NE, and AWB, are not performed, the AP performs an image quality improvement operation using the first image data and second image data.

In operation 512, the AP increases the resolution of the first image data using machine learning. The AP determines a target region by using the first image data. The target region is determined as, for example, a region that includes more edges than a predetermined criterion, but the criterion for determining the target region is not necessarily limited thereto. The AP increases image quality by performing machine learning on data that corresponds to the determined target region.

The AP generates first corrected image data by increasing the image quality of the target region in the first image data, and second corrected image data by converting a file format of the second image data into RGB.

In operation 514, the AP generates third image data by using the first corrected image data and the second corrected image data. The AP generates third image data by changing data that corresponds to the target region of the second corrected image to data that corresponds to the target region of the first corrected image.

Figure 6:
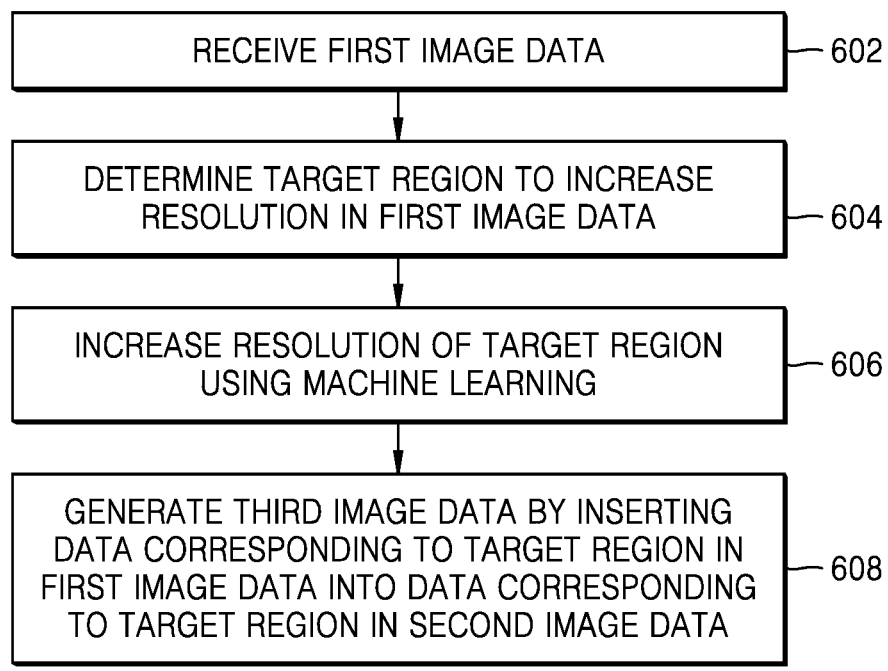
FIG. 6 is a flowchart of a method of increasing resolution of an image by an electronic device using machine learning, according to an embodiment.

FIG. 6 is a flowchart of a method of increasing the resolution of an image by an electronic device by using machine learning, according to an embodiment.

An embodiment illustrated by FIG. 6 includes operation 512 shown in FIG. 5.

Referring to FIG. 6, in an embodiment, in operation 602, the AP receives first image data. The first image data is raw data generated by the image sensor upon receiving external light.

In operation 604, the AP determines a target region in the first image data for increasing the resolution. The AP determines the target region according to various criteria. For example, when the number of edges distributed per unit area of the first image of to the first image data $d\_1$ is greater than a predetermined criterion, the AP determines a corresponding region to be the target region. According to an embodiment, the AP generates an ambiguity map based on the first image data and determines a target region in the first image of the first image data $d\_1$ by using the ambiguity map. When there are a plurality of regions in the image of the first image data $d\_1$ that satisfy the determined criterion, the AP determines the regions as the target region.

In operation 606, the AP may increase the resolution of the target region in the first image data by using machine learning. The AP may generate first corrected image data obtained by increasing the resolution of the target region in the first image data. The AP may generate second corrected image data obtained by converting a file format of the second image data into RGB.

In operation 608, the AP generates third image data by inserting data that corresponds to the target region in the first corrected image data into data that corresponds to the target region in the second corrected image data.

Figure 7:
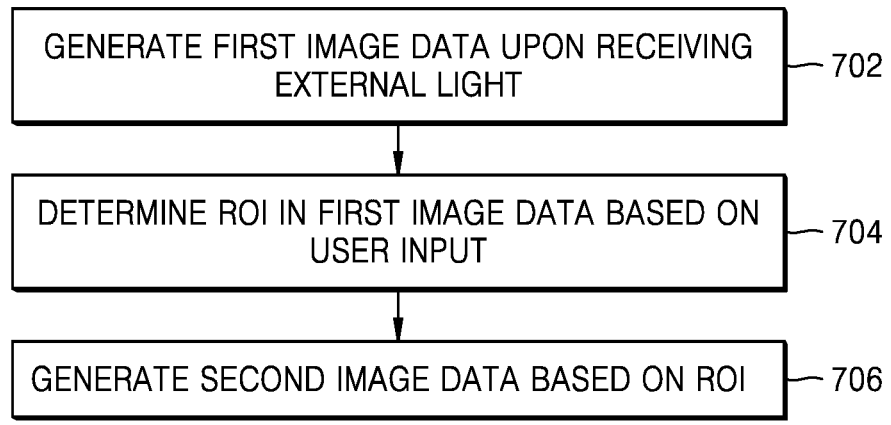
FIG. 7 is a flowchart of an operation of an electronic device that generates first image data and second image data, according to an embodiment.

FIG. 7 is a flowchart of an operation of an electronic device that generates first image data and second image data, according to an embodiment.

Referring to FIG. 7, in an embodiment, in operation 702, an image sensor generates first image data upon receiving external light. For example, when a user executes a camera application in the electronic device, the image sensor that recognizes an object currently captured by the camera converts the received light into electrical signals to generate the first image data.

In operation 704, the image sensor determines an ROI in the first image data based on a user input. When the user zooms in, the image sensor determines a zoomed region as the ROI. For example, when the user performs an operation of stretching fingers on a display, the electronic device recognizes the stretching operation as a zoom operation and determines an ROI.

In operation 706, the AP generates second image data in which a pixel array is re-mosaiced and rearranged based on the ROI.

Figure 8:
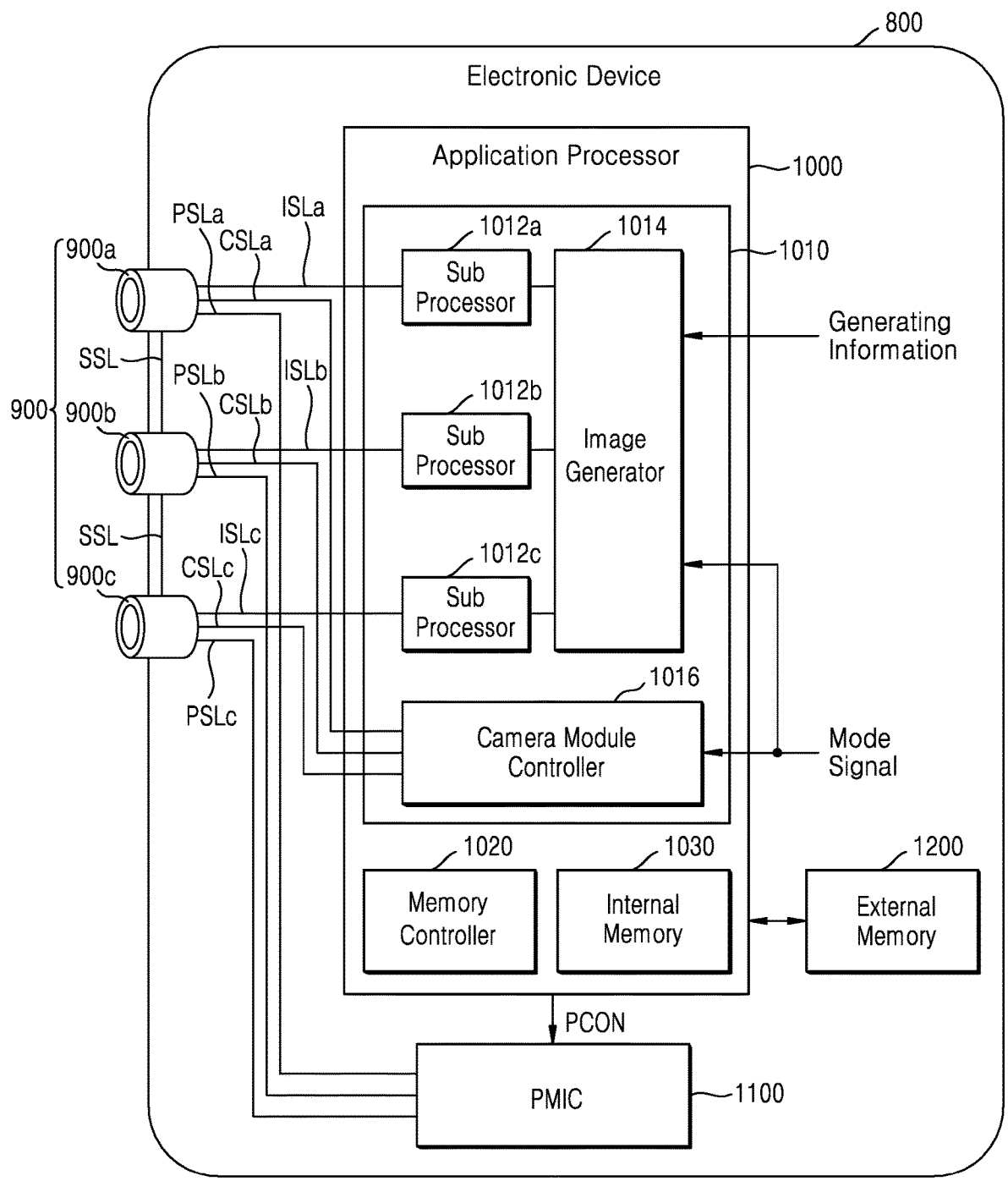
FIG. 8 is a block diagram of an electronic device that includes a multi-camera module, according to an embodiment.
Figure 9:
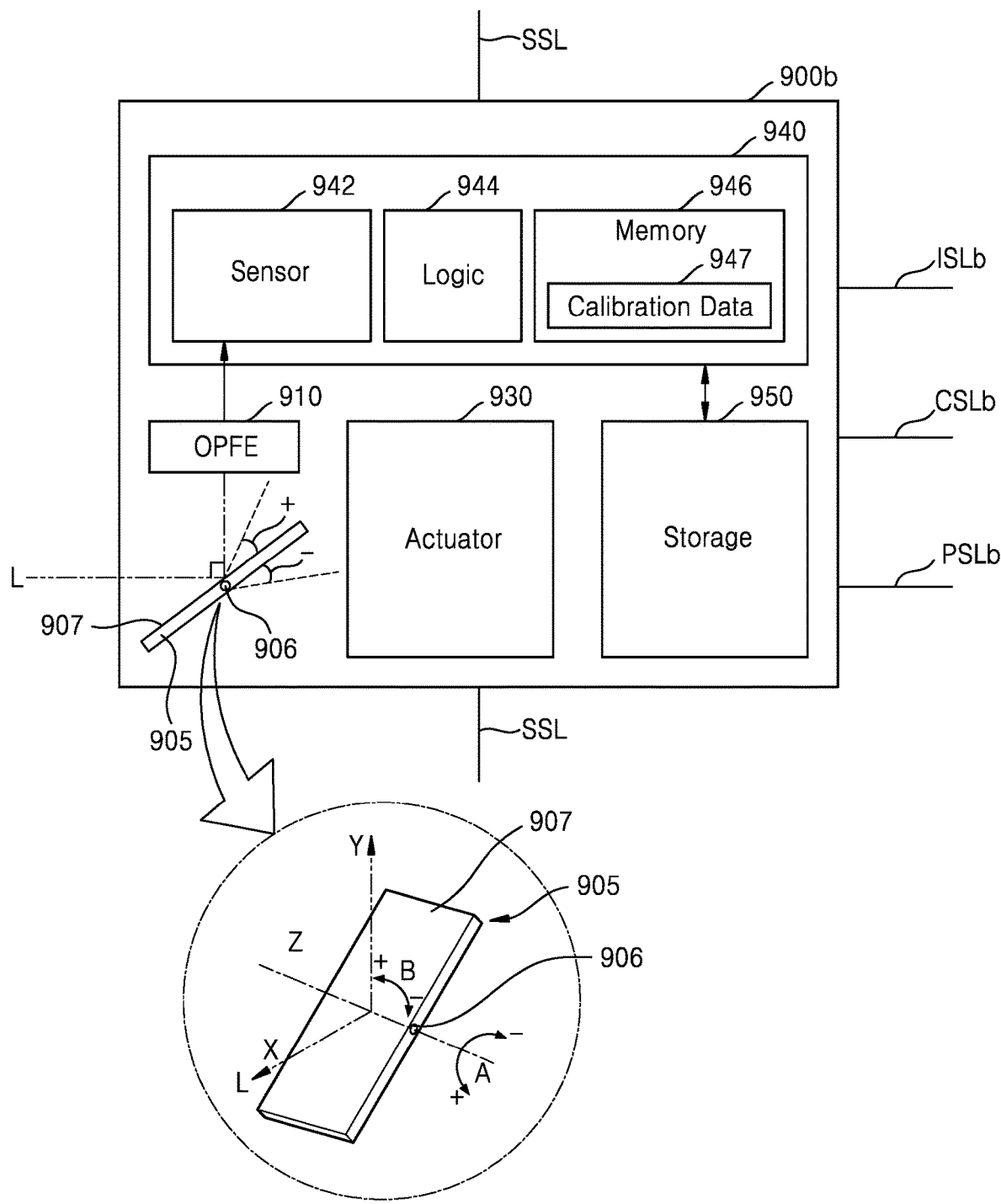
FIG. 9 is a block diagram of a camera module of FIG. 8.

FIG. 8 is a block diagram of an electronic device that includes a multi-camera module, according to an embodiment. FIG. 9 is a block diagram of a camera module of FIG. 8.

Referring to FIG. 8, in an embodiment, an electronic device 800 includes a camera module group 900, an AP 1000, a power management integrated circuit (PMIC) 1100, and an external memory 1200.

The camera module group 900 includes a plurality of camera modules 900a, 900b, and 900c. Although the drawing shows an embodiment in which three camera modules 900a, 900b, and 900c are arranged, embodiments are not necessarily limited thereto. In some embodiments, the camera module group 900 includes only two camera modules. In some embodiments, the camera module group 900 includes n camera modules, where n is a positive integer greater than or equal to 4.

Hereinafter, a detailed configuration of the camera module 900b is described in detail with reference to FIG. 9, but the following description equally applies to the other camera modules 900a and 900c, according to an embodiment.

Referring to FIG. 9, in an embodiment, the camera module 900b includes a prism 905, an optical path folding element (OPFE) 910, an actuator 930, an image sensing device 940, and a storage 950.

The prism 905 includes a reflective surface 907 of a light reflective material that changes a path of externally incident light L.

In some embodiments, the prism 905 change the path of the light L incident in a first direction X into a second direction Y perpendicular to the first direction X. In addition, the prism 905 rotates the reflective surface 907 of the light reflective material in an A direction about a central axis 906 or in a B direction about the central axis 906 to change the path of the light L incident in the first direction X into the second direction Y perpendicular thereto. Here, the OPFE 910 also moves in a third direction Z perpendicular to the first direction X and the second direction Y.

In some embodiments, as shown, a maximum rotation angle of the prism 905 in the A direction is 15 degrees or less in a positive (+) A direction and is greater than 15 degrees in a negative (−) A direction, but embodiments are not necessarily limited thereto.

In some embodiments, the prism 905 can move by about 20 degrees, or from 10 degrees to 20 degrees, or from 15 degrees to 20 degrees in a positive (+) or negative (−) B direction, and here, as for the angle of movement, the prism 905 moves at the same angle in the positive (+) or negative (−) B direction, or moves to a nearly similar angle within a range of 1 degree or less.

In some embodiments, the prism 905 moves the reflective surface 906 of the light reflective material in a third direction, such as the Z direction, parallel to an extension direction of the central axis 906.

The OPFE 910 includes, for example, an optical lens that includes m groups, where m is a positive integer. The in lenses move in the second direction Y to change an optical zoom ratio of the camera module 900b. For example, when a basic optical zoom ratio of the camera module 900b is Z, if m optical lenses in the OPFE 910 move, the optical zoom ratio of the camera module 900b changes into an optical zoom ratio of, e.g., 3Z, 5Z, or higher.

The actuator 930 moves the OPFE 910 or an optical lens, hereinafter referred to as an optical lens, to a different position. For example, the actuator 930 adjusts a position of the optical lens so that the image sensor 942 is located at a focal length of the optical lens for accurate sensing.

The image sensing device 940 includes an image sensor 942, a control logic 944, and a memory 946. The image sensor 942 senses an image of a sensing target using light L received through the optical lens. The control logic 944 controls the overall operation of the camera module 900b. For example, the control logic 944 controls the operation of the camera module 900b according to a control signal received through a control signal line CSLb.

The memory 946 stores information for the operation of the camera module 900b, such as calibration data 947. The calibration data 947 includes information for the camera module 900b to generate image data using the externally received light L. The calibration data 947 includes, for example, information on a degree of rotation described above, information on a focal length, information on an optical axis, etc. When the camera module 900b is implemented as a multi-state camera in which the focal length changes according to a position of the optical lens, the calibration data 947 includes a focal length value for each position (or state) of the optical lens and information related to auto-focusing.

The storage 950 stores image data sensed by the image sensor 942. The storage 950 is located outside the image sensing device 940, and is implemented in a stacked form with a sensor chip that constitutes the image sensing device 940. In some embodiments, the storage 950 is implemented as an electrically erasable programmable read-only memory (EEPROM), but embodiments are not necessarily limited thereto.

Referring to FIGS. 8 and 9 together, in some embodiments, each of the camera modules 900a, 900b, and 900c includes the actuator 930. Accordingly, each of the camera modules 900a, 900b, and 900c includes the same or different calibration data 947 according to the operation of the actuator 930 included therein.

In some embodiments, one of the camera modules, such as 900b), includes a folded lens-type camera module that includes the prism 905 and the OPFE 910 described above, and the other camera modules, such as 900a and 900c, are vertical type camera modules that do not include the prism 905 and the OPFE 910, but embodiments are not necessarily limited thereto.

In some embodiments, one of the camera modules, such as 900b, is a vertical depth camera that extracts depth information using, for example, infrared (IR) light. For example, the AP 1000 merges image data received from the depth camera and image data received from another camera module, such as 900a or 900b, to generate a 3D depth image.

In some embodiments, at least two of the camera modules, such as 900a and 900b) have different fields of view. For example, optical lenses of at least two camera modules, such as 900a and 900b, differ from each other, but are not necessarily limited thereto.

In addition, in some embodiments, the field of view of each of the camera modules 900a, 900b, and 900c differ from each other. For example, optical lenses in each of the camera modules 900a, 900b, and 900c are different, but are not necessarily limited thereto.

In some embodiments, each of the camera modules 900a, 900b, and 900c are physically separated from each other. For example, the camera modules 900a, 900b, and 900c do not share a sensing region of one image sensor 942 in a division manner, but an independent image sensor 942 is disposed in each of the camera modules 900a, 900b, and 900c.

Referring back to FIG. 8, in an embodiment, the AP 1000 includes an image processing device 1010, a memory controller 1020, and an internal memory 1030. The AP 1000 is implemented separately from the camera modules 900a, 900b, and 900c. For example, the AP 1000 is disposed on a separate semiconductor chip from the camera modules 900a, 900b, and 900c.

The image processing device 1010 includes a plurality of sub-image processors 1012a, 1012b, and 1012c, an image generator 1014, and a camera module controller 1016.

The image processing device 1010 includes the sub-image processors 1012a, 1012b, and 1012c that correspond to the number of camera modules, such as the camera modules 900a, 900b, and 900c.

Portions of image data respectively generated by the camera modules 900a, 900b, and 900c are respectively provided to their corresponding sub-image processors 1012a, 1012b, and 1012c through image signal lines ISLa, ISLb, and ISLc that are separated from each other. For example, image data generated by the camera module 900a is provided to the sub-image processor 1012a through the image signal line ISLa, image data generated by the camera module 900b is provided to the sub-image processor 1012b through the image signal line ISLb, and image data generated by the camera module 900c is provided to the sub-image processor 1012c through the image signal line ISLc. Such image data transmission is performed by using, for example, a camera serial interface (CSI) based on a mobile industry processor interface (MIPI), but embodiments are not necessarily limited thereto.

In some embodiments, a single sub-image processor is provided that corresponds to a plurality of camera modules. For example, the sub-image processor 1012a and the sub-image processor 1012c are not separately implemented from each other as shown, but are integrated into a single sub-image processor, and the portions of image data received from the camera module 900a and the camera module 900c are selected through a selection device, such as a multiplexer, etc., and then provided to the integrated sub-image processor.

The portions of image data respectively provided to the sub-image processors 1012a, 1012b, and 1012c are provided to the image generator 1014. The image generator 1014 generates an output image using the portions of image data respectively received from the sub-image processors 1012a, 1012b, and 1012c according to image generating information or a mode signal.

In an embodiment, the image generator 1014 generates an output image by merging at least some of the portions of image data generated by the camera modules 900a, 900b, and 900c that have different viewing angles according to the image generating information or the mode signal. In addition, the image generator 1014 generates an output image by selecting one of the image data portions generated by the camera modules 900a, 900b), and 900c according to the image generating information or the mode signal.

In some embodiments, the image generating information includes a zoom signal or zoom factor. In addition, in some embodiments, the mode signal is, for example, a signal based on a mode selected by a user.

When the image generating information is a zoom signal or a zoom factor, and the camera modules 900a, 900b, and 900c have different viewing fields or viewing angles, the image generator 1014 performs different operations, depending on the type of the zoom signal. For example, when the zoom signal is a merge signal, the image generator 1014 merges the image data output from the camera module 900a with the image data output from the camera module 900c into a merged image signal, and then generates an output image using image data output from the camera module 900b that was not used for generating the merged image signal. If the zoom signal is a another, different signal, the image generator 1014 does not perform such image data merging, but generates an output image by selecting one of the image data portions respectively output from the camera modules 900a, 900b, and 900c. However, embodiments are not necessarily limited thereto, and methods of processing image data may be modified and implemented as needed.

In some embodiments, the image generator 1014 receives a plurality of image data portions that have different exposure times from at least one of the sub-image processors 1012a, 1012b, and 1012c, and performs high dynamic range (HDR) processing on the image data portions to generate merged image data that has an increased dynamic range.

The camera module controller 1016 provides control signals to the camera modules 900a, 900b, and 900c. The control signals generated by the camera module controller 1016 are provided to the camera modules 900a, 900b, and 900c through respective control signal lines CSLa, CSLb, and CSLc that are separated from each other.

One of the camera modules 900a, 900b, and 900c, such as 900b, is designated as a master camera according to the image generating information or the mode signal, and the other camera modules, such as 900a and 900c, are designated as servant cameras. Such information is included in the control signals and provided to their corresponding camera modules 900a, 900b, and 900c through the respective control signal lines CSLa, CSLb, and CSLc.

Camera modules operating as a master and a servant can be changed according to a zoom factor or an operation mode signal. For example, when the viewing angle of the camera module 900a is wider than that of the camera module 900b and the zoom factor indicates a low zoom ratio, the camera module 900b operates as a master and the camera module 900a operates as a servant. Conversely, when the zoom factor indicates a high zoom ratio, the camera module 900a operates as a master and the camera module 900b operates as a servant.

In some embodiments, the control signals provided from the camera module controller 1016 to the camera modules 900a, 900b, and 900c include a sync enable signal. For example, when the camera module 900b is a master camera and the camera modules 900a and 900c are servant cameras, the camera module controller 1016 transmits the sync enable signal to the camera module 900b. The camera module 900b that receives the sync enable signal generates a sync signal based on the received sync enable signal and transmits the generated sync signal to the camera modules 900a and 900c through the sync signal line SSL. The camera module 900b and the camera modules 900a and 900c are synchronized by the sync signal to transmit image data to the AP 1000.

In some embodiments, the control signals provided from the camera module controller 1016 to the camera modules 900a, 900b, and 900c include mode information according to the mode signal. Based on the mode information, the camera modules 900a, 900b, and 900c operate in a first operation mode or a second operation mode based on a sensing speed.

In the first operation mode, the camera modules 900a, 900b, and 900c generate an image signal at a first frame rate, encode the generated image signal at a second frame rate higher than the first frame rate, and transmit the encoded image signal to the AP 1000. For example, the second rate is 30 times or less of the first rate.

The AP 1000 stores the received image signal, such as the encoded image signal, in the internal memory 1030 or the external memory 1200, and thereafter, the AP 1000 reads the encoded image signal from the internal memory 1030 or the external memory 1200, decodes the image signal, and displays image data generated from the decoded image signal. For example, one of the sub-image processors 1012a, 1012b, and 1012c of the image processing device 1010 performs decoding and image processing on the decoded image signal.

In the second operation mode, the camera modules 900a, 900b, and 900c generate an image signal at a third frame rate that lower than the first frame rate, and transmit the image signal to the AP 1000. The image signal transmitted to the AP 1000 is an unencoded signal. The AP 1000 performs image processing on the received image signal or stores the image signal in the internal memory 1030 or the external memory 1200.

The PMIC 1100 supplies power, such as a power supply voltage, to each of the camera modules 900a, 900b, and 900c. For example, the PMIC 1100 supplies first power to the camera module 900*a* through the power signal line PSLa, second power to the camera module 900*b* through the power signal line PSLb, and third power to the camera module 900*c* through the power signal line PSLc, under control of the AP 1000.

The PMIC 1100 generates power that corresponds to each of the camera modules 900*a*, 900*b*, and 900*c*. In response to a power control signal PCON received from the AP 1000, and also adjusts a power level. The power control signal PCON includes a power adjustment signal for each operation mode of the camera modules 900*a*, 900*b*, and 900*c*. For example, the operation modes include a low power mode, and the power control signal PCON includes information for a camera module that operates in the low power mode and a set power level. Power levels respectively provided to the camera modules 900*a*, 900*b*, and 900*c* may be the same as or differ from each other. In addition, power levels can change dynamically. According to embodiments of inventive concept, resources of an image sensor are secured and system performance is increased by allowing the AP to perform some of the image generating process.

While embodiments of the inventive concept has been particularly shown and described with reference to the drawings, it will be understood that various changes in form and details may be made therein without departing from the spirit and scope of the following claims.

What is claimed is:

1. An electronic device, comprising:
   an image sensor that generates first image data, which is raw data having a color filter array (CFA) structure generated by receiving external light, generates second image data that has a pattern structure different from that of the first image data and includes Bayer pattern data, based on the first image data, and outputs the first image data and the second image data; and
   an application processor that increases resolution of at least a region of an image that corresponds to the first image data using a machine learning algorithm and outputs third image data that includes at least a portion of the first image data with increased resolution and at least a portion of the second image data,
   wherein, upon receiving the first image data, the application processor determines at least one target region in the first image data by determining that resolution in the at least one target region should be increased, and
   wherein the application processor generates an ambiguity map for the first image data, and determines the at least one target region in the image that corresponds to the first image data by using the ambiguity map.

2. The electronic device of claim 1, wherein the image sensor generates the second image data by performing an image signal processor (ISP) operation based on the first image data.

3. The electronic device of claim 2, wherein the ISP operation includes generating the second image data with increased resolution using a remosaic algorithm.

4. The electronic device of claim 1, wherein the application processor converts the second image data from the Bayer pattern data to red, green, and blue (RGB) data.

5. The electronic device of claim 4, wherein the application processor determines whether to perform real-time processing on the second image data based on whether at least one of an auto exposure (AE), an auto focus (AF), or an auto white balance (AWB) operations is executed, and transmits the RGB data to the image sensor without applying deep learning to the first image data, when the application processor determines that real-time processing is not performed on the second image data.

6. The electronic device of claim 1, wherein the application processor increases the resolution of the at least one target region based on the first image data by using the machine learning algorithm.

7. The electronic device of claim 6, wherein the application processor generates the third image data by inserting data that corresponds to a target region in the first image data into data that corresponds to the target region in the second image data.

8. The electronic device of claim 1, wherein the application processor receives the second image data, determines at least one target region by determining that resolution in the at least one target region should be increased, and transmits information of the at least one target region to the image sensor.

9. The electronic device of claim 8, wherein the image sensor receives information on the at least one target region, and generates first image data that includes data that corresponds to an image of the at least one target region based on the received information of the at least one target region.

10. The electronic device of claim 1, wherein the first image data is a Q cell image or a tetra cell image.

11. A method of generating a high-definition image using an electronic device that includes an image sensor and an application processor, the method comprising:
    generating first image data upon receiving external light, wherein the first image data is raw data having a color filter array (CFA) structure;
    generating second image data based on the first image data, wherein the second image data has a pattern structure different from the of the first image data and includes Bayer pattern data;
    outputting the first image data and the second image data; and
    increasing resolution of at least a region of an image that corresponds to the first image data by using a machine learning algorithm and outputting third image data that includes a portion of the first image data with increased resolution and-a portion of the second image data,
    wherein outputting the third image data includes receiving the first image data and determining at least one target region by determining that resolution in the at least one target region should be increased, and
    wherein determining the at least one target region includes:
      generating an ambiguity map for the first image data; and
      determining the at least one target region in an image that corresponds to the first image data by using the ambiguity map.

12. The method of claim 11, wherein generating the second image data includes generating the second image data by performing an image signal processor (ISP) operation on the first image data.

13. The method of claim 12, wherein the ISP operation includes generating the second image data with increased resolution using a remosaic algorithm.

14. The method of claim 11, wherein generating the third image data includes increasing the resolution of the at least one target region based on the first image data by using the machine learning algorithm.

15. A non-transitory computer-readable recording medium that stores an instruction that implements a method of generating a high-definition image, wherein the method includes:

generating first image data by controlling an image sensor to receive external light, wherein the first image data is raw data having a color filter array (CFA) structure;

generating second image data based on the first image data by controlling the image sensor, wherein the second image data has a pattern structure different from the of the first image data and includes Bayer pattern data;

increasing resolution of at least a region of an image that corresponds to the first image data by using a machine learning algorithm, and generating third image data that includes at least-a portion of the first image data with increased resolution and at least-a portion of the second image data, wherein outputting the third image data includes receiving the first image data and determining at least one target region by determining that resolution in the at least one target region should be increased, and wherein determining the at least one target region includes:

generating an ambiguity map for the first image data; and determining the at least one target region in an image that corresponds to the first image data by using the ambiguity map.

* * * * *